United States Patent [19]

Nash et al.

[11] 4,409,788
[45] Oct. 18, 1983

[54] ACTUATION SYSTEM FOR USE ON A GAS TURBINE ENGINE

[75] Inventors: Dudley O. Nash; Thomas S. Clayton, both of Cincinnati, Ohio

[73] Assignee: General Electric Company, Cincinnati, Ohio

[21] Appl. No.: 252,687

[22] Filed: Apr. 9, 1981

Related U.S. Application Data

[63] Continuation-in-part of Ser. No. 32,330, Apr. 23, 1979, abandoned.

[51] Int. Cl.³ .............................................. F02K 3/075
[52] U.S. Cl. ..................................... 60/226.3; 415/157
[58] Field of Search ............. 60/226 B, 262; 415/160, 415/162, 157; 24/99 R, 110

[56] References Cited

U.S. PATENT DOCUMENTS

| | | | |
|---|---|---|---|
| 2,861,774 | 11/1958 | Bochi | 415/157 |
| 2,955,744 | 10/1960 | Hemsworth | 415/160 |
| 3,458,118 | 7/1969 | Burge et al. | 415/160 |
| 3,861,822 | 1/1975 | Wanger | 415/162 |
| 3,990,809 | 11/1976 | Young et al. | 415/160 |
| 4,175,384 | 11/1979 | Wagenknecht et al. | 60/226 B |
| 4,285,194 | 8/1981 | Nash | 60/262 |

FOREIGN PATENT DOCUMENTS

1255010 11/1971 United Kingdom .
2003988 3/1979 United Kingdom .
2038421 7/1980 United Kingdom .

Primary Examiner—Louis J. Casaregola
Attorney, Agent, or Firm—Francis L. Conte; Derek P. Lawrence

[57] ABSTRACT

An actuation system is provided for transferring axial motion into an interior of a gas turbine engine at a number of locations around an outer casing of the engine, with one synchronous movement. An external hydraulic actuator activates the system by rotating one outer crank which, in turn, rotates a single outer yoke. The yoke is mechanically linked to a plurality of crankshafts that extend through the outer casing of the engine and transmit rotational movement into the engine interior. The crankshafts are linked inside the engine to an annular sliding member causing that member to move axially. In one embodiment of this invention, the actuation system is used to open and close a slide valve between inner and outer bypass ducts of a variable cycle aircraft engine.

11 Claims, 7 Drawing Figures

ACTUATION SYSTEM FOR USE ON A GAS TURBINE ENGINE

This is a continuation-in-part of application Ser. No. 32,330, filed Apr. 23, 1979 (abandoned).

CROSS REFERENCE TO RELATED APPLICATION

This invention is cross referenced to a simultaneously filed patent application containing certain common subject matter and entitled, "Apparatus and Method for Controlling Fan Duct Flow in a Gas Turbine Engine," assigned to the same assignee as the present invention.

BACKGROUND OF THE INVENTION

1. Field of the Invention

This invention relates to actuation systems for use in gas turbine engines and, more particularly, actuation systems for transferring movement of an external actuator into an interior of a gas turbine engine to actuate an internal sliding member or valve.

2. Description of the Prior Art

The development of this invention was precipitated by advanced versions of variable cycle gas turbine engines. Since the 1950's, there has been ongoing development of this type of engine for use in jet aircraft. In the variable cycle engine, relative amounts of air directed through a fan bypass cycle, as opposed to a combustion cycle, are varied under different operating conditions to improve engine performance. In one embodiment of this engine, airflow is controlled by a forward sliding valve system, called a variable area bypass injector (forward VABI), that is located in a passage between an inner and outer bypass duct, and is opened and closed to vary the amount of fan air flowing into the outer bypass duct and, therefore, bypassing the combustion cycle. An additional valve-like mechanism, called a rear variable area bypass injector (rear VABI), is provided at the end of the bypass duct for injecting bypass airflow back into the core engine flow. For a detailed description of this type of variable cycle engine, the reader is referred to U.S. Pat. No. 4,068,471, issued Jan. 17, 1978, assigned to the same assignee as the present invention, and the disclosed material of which is incorporated herein by reference.

The forward and rear bypass valves are designed to be operated by an actuating mechanism that is capable of transferring axial motion from external actuators through an outer casing of the engine to the internally mounted valve. In prior art mechanisms, this type of transfer of motion is often accomplished by multiple radial shafts extending through the engine casing. Mechanisms capable of driving a multiple radial shaft arrangement by means of two or more actuators have been developed. Well known examples that have been used on turbojet engines for many years are the systems used to actuate variable angle compressor stator vanes. Variable angle compressor stator vanes are rotated as engine speed is varied to accomodate the varying rotor discharge vector angles. These vanes are simultaneously actuated by rotating unison rings which interconnect all the vanes by means of cranks attached to the vane shanks. The vane shanks project radially through the aircraft engine casing wall so that rotating the vane shanks causes all of the vanes inside the engine to rotate through an identical angle. Motion is initiated by two symmetrically arranged actuators that rotate the unison rings.

While this type of system is ideal for rotating multiple engine stator vanes with multiple radial shafts, it has limitations where relatively few radial shafts are to be rotated in unison, as in the case of the forward and rear VABI's on the variable cycle engine. In the variable cycle engine, it is desirable to use as few as three radial shafts to actuate the valve in order to eliminate weight and complexity. When fewer radial shafts are employed, the shafts are more widely separated physically, and it is more difficult to mechanically synchronize the rotation of the shafts.

An additional problem occurs on the forward sliding valve, because it is located in the forward portion of the aircraft engine where controls and accessories necessarily occupy a considerable portion of the underside of the engine casing. The unison ring employed in previous mechanisms circumferentially surrounds the entire engine casing and therefore would occupy part of the same space. Physical interference of the ring with the controls package would result in both increased size of a surrounding envelope and in maintenance problems due to difficulty involved in assembly or removal of an actuation ring inside the controls package. Still another problem results from the location of part of or all the valve actuating mechanism in the interior of a gas turbine engine. For instance, the location of such a mechanism in the outer bypass duct of a gas turbine engine adversely affects overall engine performance by constituting a partial flow obstruction to the fan air passing therethrough. Such a flow obstruction causes aerodynamic drag losses in the fan air which results in decreased engine performance.

Finally, it is desirable to employ an actuation system using only one actuator to save weight and reduce complexity.

SUMMARY OF THE INVENTION

Therefore, it is an object of the present invention to provide an actuation system that synchronously transfers an axial movement of one or more actuators through an outer casing of an aircraft engine to axially move an internally mounted sliding flow valve.

It is another object of the present invention to provide an actuation system for operating an internally mounted valve with a system that does not envelop an entire circumference of an outer casing of an aircraft engine, thus avoiding any physical interference with a controls and accessories package or any other items attached to the outer casing of the engine.

It is another object of the present invention to provide an actuation system for translating an internally mounted valve which effectively minimizes aerodynamic internal airflow drag losses therefrom.

Finally, it is an object of the present invention to provide an actuation system for an internal valve on an aircraft engine that uses few radial shafts and is therefore both lower in weight and less complex than similar currently employed actuation systems.

The present invention is a unique actuation system that is capable of transferring a linear motion of a single or a plurality of actuators located outside an aircraft engine casing, into an engine interior, to advance and retract a sliding member. In one embodiment of this present invention, a single actuator activates the system by rotating a single crankshaft. That crankshaft is mechanically linked to a plurality of crankshafts by means of a rotating yoke thereby causing all the crankshafts to rotate simultaneously. The crankshafts extend through the outer casing of the engine and transfer the motion into the engine interior. Inside the engine, the motion is communicated from the crankshafts to an annular sliding member or valve through radially flexible, relatively thin cranks arms, causing the sliding member to advance and retract axially. In one embodiment of this invention, the actuation system is used to open and close a sliding valve between inner and outer bypass ducts on a variable cycle engine.

DESCRIPTION OF THE DRAWINGS

The present invention will become more clearly understood by reference to the appended specification in conjunction with the drawings wherein.

Figure 1:
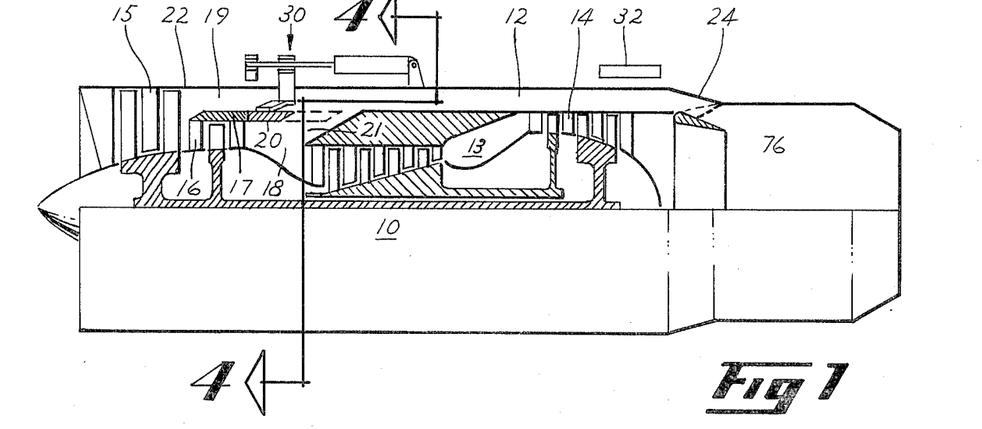
FIG. 1 depicts a cross-sectional view of a gas turbine aircraft engine employing the present invention.

Referring now to FIG. 1, a variable cycle gas turbine aircraft engine 10 is shown of the type that precipitated the development of the subject invention. This engine 10 employs multiple ducts to vary the relative amount of air directed through a bypass duct 12, rather than through combustor 13 and turbine 14, under different operating conditions to improve engine performance. The engine's capability to vary this airflow permits the engine 10 to operate in a high bypass cycle at subsonic speeds and, conversely, operate in a low bypass cycle at supersonic speeds. Variation of the engine operating cycle in this manner greatly improves the overall operating efficiency of the engine. For a detailed description of this type of variable cycle engine, refer to the previously referenced U.S. Pat. No. 4,068,471.

In engine 10, incoming air is initially accelerated by a first fan 15. An annular divider 17 splits this airflow and directs a portion of the flow through an inner bypass duct 18 and the remaining portion through an outer bypass duct 19. Air flowing through the inner duct 18 is further accelerated by a second fan 16. Because of changes in operating conditions, it is desirable to direct varying amounts of airflow from the inner duct 18, through passage 21, to the bypass duct 12. To control the amount of air flowing from the inner duct 18 into the bypass duct 12, an annular translating member such as a cylindrical sliding valve 20, known as a forward variable area bypass injector (forward VABI) is provided in passage 21. This sliding valve 20 is retained in a forward position, as shown by solid lines in FIG. 1, to permit maximum airflow to enter the bypass duct 12 under subsonic aircraft cruise conditions. As the aircraft enters supersonic operation, the valve 20 is translated to an aft position, as shown by the dotted outline in FIG. 1. In the aft position, the valve 20 restricts the amount of flow entering the bypass duct 12, thereby forcing a larger volume of second fan air to enter the combustor 14 and add to the combustive flow of thrust-producing gases.

To operate valve 20, the present invention provides a simple, effective, and lightweight actuation system 30. The bulk of this actuation system 30 is located outside an outer casing 22 surrounding the outer duct 19 and the bypass duct 12. Thus, the actuation system 30 does not significantly interfere with the passage of air through the outer duct 19. Additionally, the actuation system 30 is constructed to eliminate leakage causing holes in the outer casing 22, thereby preventing any major loss of air from outer duct 24.

Figure 2:
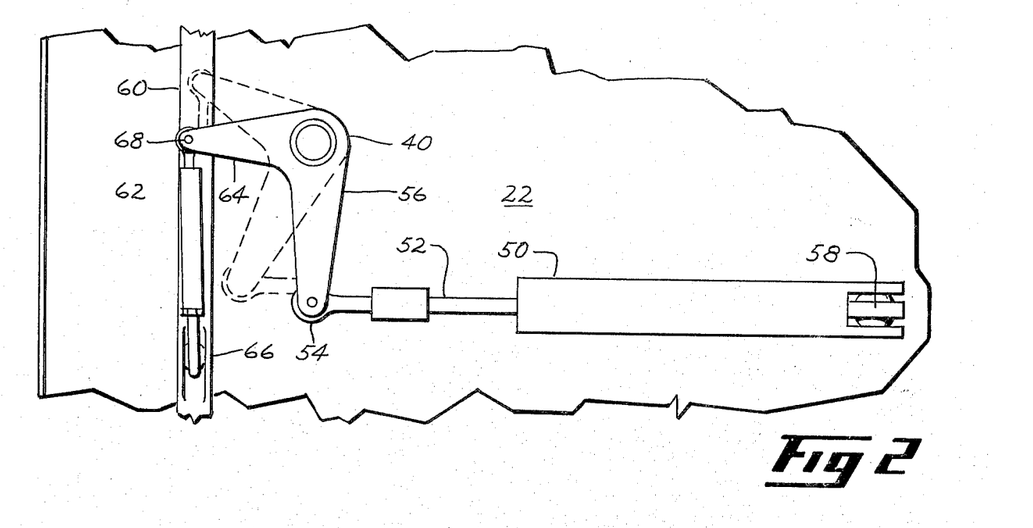
FIG. 2 depicts a fragmentary elevation view of the subject invention.

Referring now to FIG. 2, this elevation view of the actuation system 30 shows one embodiment of the system mounted on the outer casing 22 of the aircraft engine. Only the external components of the actuation system 30 are shown, and the sliding valve 20 is hidden from view by the outer surface of the casing 22.

Figure 3:
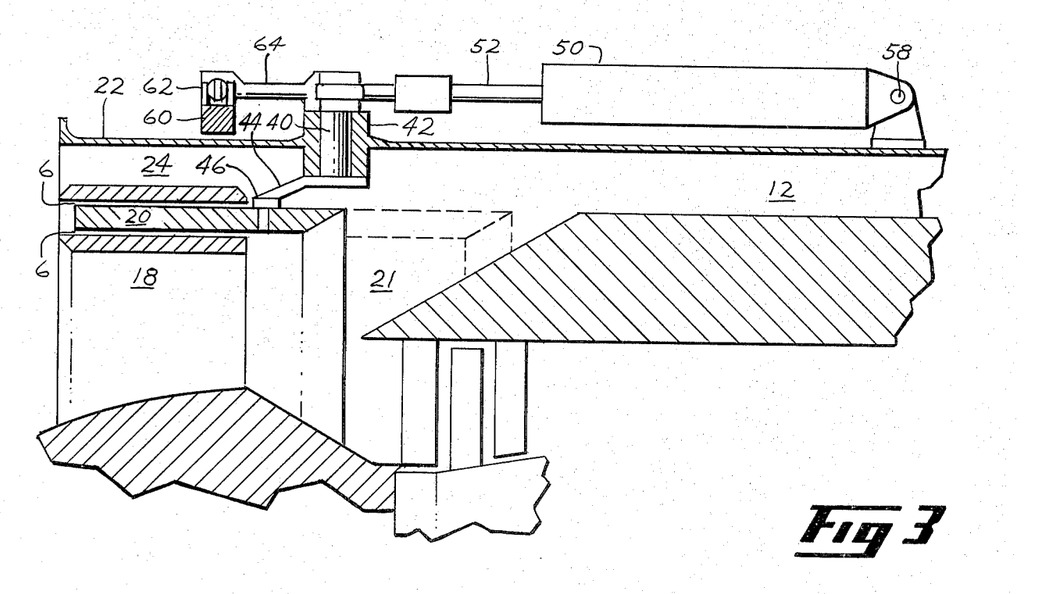
FIG. 3 depicts a plan view, partly in section and partly broken away, of the subject invention in conjunction with a slide valve.

A plurality of rotating crankshafts 40, one of which is shown in FIGS. 2 and 3, are provided to transfer an actuating force or rotational movement through the outer casing 22 into the outer duct 24. A rotating crankshaft is ideal for this function because it is easily enveloped by a bushing 42 that prevents leakage airflow from escaping the outer duct 24 around the sides of the crankshaft 40.

The crankshaft shown in FIGS. 2 and 3 is described first because it forms the focal point of the actuation system components. The basic mechanical theory of this system 30 is to transform a linear motion outside the casing 22 into a partial rotation of each of the plurality of crankshafts 40; then inside the outer casing to transform the partial rotation of the crankshafts back into a linear, axial movement of a sliding member. In the embodiment shown in FIGS. 2, 3, and 4, the sliding member is a slide valve 20. The transfer of mechanical action through the outer casing 22 is particularly easy to see in FIGS. 3 and 4. A detailed explanation follows of the components employed to effect this transfer and of the advantages of these components.

Referring again to FIG. 2, a hydraulic linear actuator 50, employing hydraulic pressure as an actuating force, is provided for initiating the linear motion in the actuation system 30. The actuator 50 is controlled by a separate control system, not shown, which does not form a part of the subject invention. At appropriate stages in aircraft operation, the control system causes the actuator to extend or retract an actuator rod 52. The actuator rod 52 is connected with a pin attachment 54 to an actuating crank arm 56, later referred to herein as a third crank arm. The crank arm 56 is, in turn, directly attached to one of a plurality of crankshafts 40 thereby causing partial rotation of that crankshaft upon extension of the actuator rod 52. The dashed line drawing in FIG. 2 of the actuator rod 52 and crank arm 56 shows the extended position of the crank arm and the corresponding partial rotation of the crankshaft. The actuator 50 is mounted, such as with a ball and socket mount 58, to allow the actuator to pivot through a slight angle during extension or retraction of the actuator rod 52. When the actuator and actuator rod 52 are in an extended mode, the sliding member valve 20 is an "open" position, shown with solid lines in FIG. 3; and, conversely, when the actuator is in a retracted mode, the valve 20 is in a "partially closed" position, shown in dashed lines in FIG. 3. The manner in which this is accomplished will become apparent from the remainder of this description.

Figure 4:
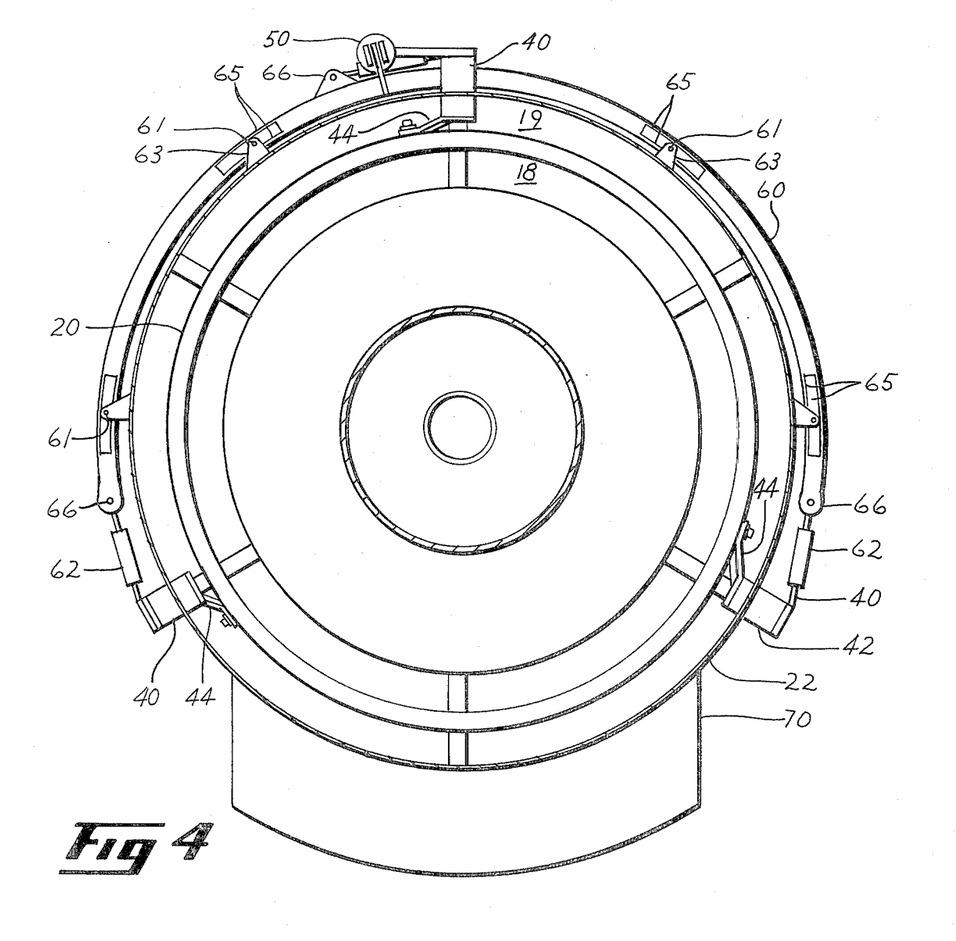
FIG. 4 depicts a plan view of the subject invention as seen along line 4—4 from FIG. 1.
Figure 4A:
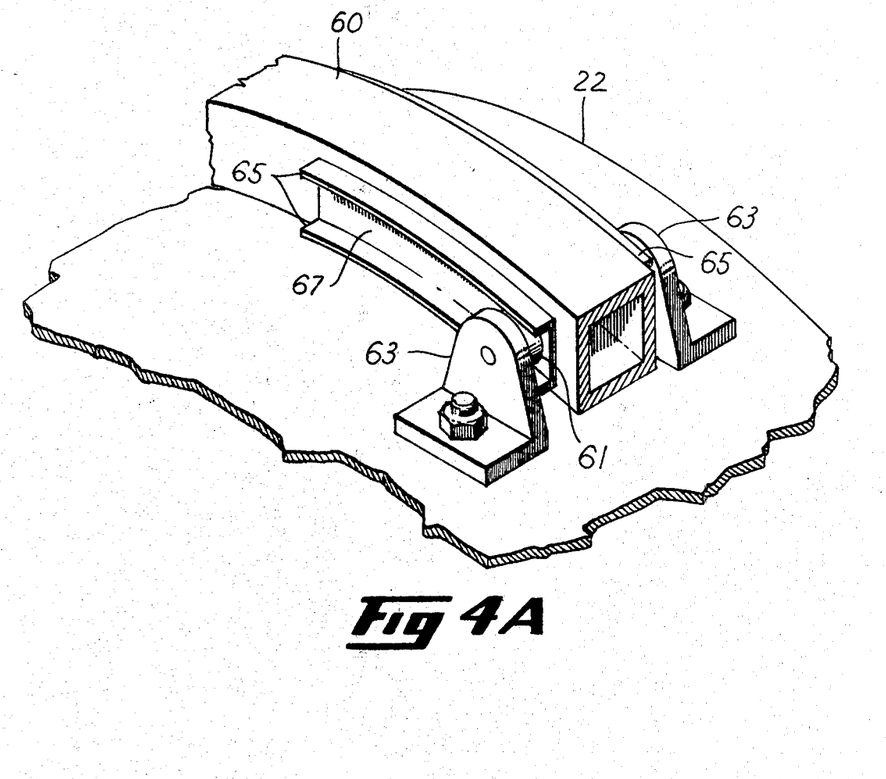
FIG. 4a is a fragmentary perspective view of a section of the synchronizing yoke mounting and guiding means.

As stated earlier, in the currently described embodiment of this invention, a single actuator 50 is directly linked to a single crankshaft. Apparatus is provided for the purpose of simultaneously causing partial rotation of the remainder of the plurality of crankshafts 40 upon rotation of the single crankshaft by the actuator 50. Referring now to FIG. 4, there are shown three crankshafts 40 and a single actuator 50. The primary component of the apparatus provided for synchronously actuating all of the crankshafts is an arcuate actuating and synchronizing member or yoke 60 circumferentially mounted for rotation about a portion of the outer casing 22. Due to the fact that yoke 60 transmits large actuation forces from the single linear actuator 50, it is subjected to a considerable load. Accordingly, yoke 60 comprises an arcuate, hollow member having a rectangular and preferably square cross section as illustrated in FIG. 4 and more particularly in FIG. 4a, which provides structural strength and rigidity with a minimum amount of weight. Alternatively, yoke 60 can comprise a solid rectangular cross section as well as various other cross sections which can be determined for any particular design requirement desired.

Yoke 60 is supported for circumferential rotation and for axial and radial restraint. More specifically, and as seen in FIG. 4, several circumferentially spaced mounting means are provided for supporting and guiding yoke 60. The mounting means each comprise a pair of arcuate channel members each affixed to an opposite axial side surface of yoke 60. The channel members comprise side sections which cooperate to define a radially spaced pair of concentric arcuate guide tracks 65 on each side of yoke 60. Disposed between each pair of guide tracks is a roller 61, such as a needle-bearing cylindrical roller or a cam follower roller, mounted for free rotation on a support bracket 63, suitably affixed to the outer casing 22. Rub pads 67 comprising friction-reducing material are attached to the bottoms of the channel members between each pair of concentric guide tracks 65 thereof for providing a low friction contact area between the ends of respective ones of said rollers 61 and the channel members mounted on yoke 60. Movement of yoke 60 is thusly constrained to circumferential rotation only. More specifically, yoke 60 is allowed to rotate freely circumferentially on rollers 61, which rollers are restrained to rotate between guide tracks 65 mounted on yoke 60 for thereby preventing yoke 60 from moving radially. Furthermore, inasmuch as rollers 61 abut rub pads 67 on opposite axial sides or yoke 60, yoke 60 is also prevented from moving axially.

Yoke 60 extends around approximately two-thirds of the casing 22, thereby leaving a lower region free of any external actuating system apparatus. With most aircraft engines this space is occupied by what is commonly referred to as a controls and accessories envelope 70. However, the arcuate yoke 60 can comprise and annular ring where space requirements permit and the increased weight therefrom is not a determining factor.

Referring now to FIGS. 2 and 4, the yoke 60 is linked to each of the crankshafts with individual link arms 62. The link arms are attached to their opposite ends to individual first crank arms 64 extending from the crankshafts. This linkage of the yoke to the crankshafts 40 causes each of the crankshafts to rotate an equivalent amount when the yoke 60 is partially rotated around the casing 22. Thus, when the single actuator 50 directly rotates one crankshaft, the remainder of the plurality of crankshafts 40 are caused to simultaneously rotate an equivalent amount.

The link arms 62 must be attached in a manner that accommodates nonlinear movement of the link arms during partial rotation of the crankshafts 40. Therefore, in the embodiment shown, the link arms 62 are connected with a ball and socket 66 to the yoke 60 and with a ball and socket 68 to the crank arms 64.

Yoke member 60 and the mounting means therefor provide a new and improved apparatus for effectively transmitting substantially all of a large actuation force generated by actuator 50 and required for translating annular slide valve 20 with a minimum amount of force loss due to friction. More specifically, inasmuch as link arms 62 are substantially aligned tangentially with and in the same transverse plane as the yoke 60, they effectively transmit substantially all the actuation force from first crank arms 64 tangentially to yoke 60 causing yoke 60 to be actuated only circumferentially and accordingly relatively little of the actuation force from first crank arms 64 is exerted, and therefore lost, in the axial direction. Additionally, inasmuch as link arms 62 are pivotally connected to their cooperating members by ball and socket joints for accommodating any radial or axial relative movement between yoke 60 and first crank arms 64, little of the actuation forces transmitted therebetween is lost due to friction in the joints thereof. Finally, inasmuch as the yoke mounting means comprises low friction rollers and rub pads, little of the actuation forces is lost due to friction therein.

It can now be appreciated that extension of the actuator rod 52 will cause all of the crankshafts 40 to rotate an equivalent amount. Referring now to FIGS. 3 and 4, a mechanism is shown for transforming this common rotational movement to a linear, axial movement of a sliding member or valve 20 within the outer casing 22. As stated earlier, the crankshafts 40 extend through the outer casing 22 into the outer duct 19. Disposed within outer duct 19 are a plurality of radially flexible and thin second crank arms 44, each of which connects a respective crankshaft 40 to valve 20 for effecting axial translation of the valve. More specifically, each crank arm 44 has one end thereof fixedly connected to a respective crankshaft 40 for rotation therewith and an opposite end thereof pivotally connected to valve 20 with a ball and socket joint 46 to accommodate compound motion effects. The valve 20 is sandwiched between inner and outer guides 26 for providing an aerodynamically continuous flow path, maintaining the valve accurately positioned therebetween, and preventing the valve from tilting or skewing as it translates. When the actuator 50 is in the extended mode, the valve 20 is in the "open" position, shown by the solid outline in FIG. 3, and when the actuator 50 is in the retracted position, the valve 20 is in the "partially closed" position, shown by the dashed lines in FIG. 3. When valve 20 is in an intermediate position between "open" and "partially closed", which occurs when the engine is operating at a predetermined cruise speed, the second crank arms 44 are initially oriented substantially in a tangential direction and extend slightly radially inwardly to valve 20. In this position, crank arms 44 expose essentially only side profiles to the fan air flowing thereacross and through outer duct 19. To minimize aerodynamic drag losses, such side profiles are made as thin as possible with respect to the thickness or radial depth of outer duct 19.

This is accomplished by having any representative cross section of crank arms 44 approximate a low drag airfoil cross section in which the thickness of the cross section is relatively thin with respect to the chordal, or transverse, axis of the cross section and with respect to the thickness or depth of outer duct 19. For example, in the disclosed structure and as shown in FIG. 4 crank arms 44 have relatively thin rectangular cross sections preferably only about 100 mils thick. Accordingly, the substantially tangential orientation of these radially thin crank arms 44 provides reduced aerodynamic drag losses therefrom which results in improved aerodynamic performance and thrust output of the engine. Shown also in FIGS. 3 and 4 is valve 20 in an "open" position having crank arms 44 extending partly axially in the forward direction and partly radially inwardly to valve 20. In this position, crank arms 44 present an increased effective drag profile including the radially outer surface thereof to the fan air flowing thereacross. Such increased effective profile results in higher aerodynamic drag losses than encountered when crank arms 44 are oriented substantially in the tangential position wherein only the side profiles of crank arms 44 are exposed to the airflow. Similarly, when valve 20 is in the "partially closed" position, crank arms 44 extend partly axially in the aft direction and partly radially inwardly to valve 20 presenting an increased effective drag profile including the radially inner surface thereof to the fan airflow. In all operating positions, however, aerodynamic drag losses are less than those resulting from the use of conventional crank arms having substantially thicker or wider profile dimensions.

During operation and when crank arms 44 rotate from the tangential position, valve 20 is caused to rotate circumferentially as well as translate axially within guides 26 causing the opposite ends of crank arms 44 connected to valve 20 to move radially inwardly. Conventional crank arms are pivotally attached to respective crankshafts for accommodating this radial movement. In the present invention, this radial movement is accommodated by the elastic flexibility of crank arms 44 which are fixedly connected to respective crankshafts. More specifically, the relative thickness of crank arms 44 in the radial direction results in a structure having flexibility for bending in that direction as well as for providing reduced aerodynamic drag losses therefrom. Although crank arms 44 are relatively thin and flexible in the radial direction, they are conversely relatively wide, and accordingly rigid, in the transverse, axial direction and thereby are effective for transferring substantial actuating forces for translating valve 20.

It will become apparent to those skilled in the art after having considered the present disclosure that the geometry of crank arms 44 can be readily determined for obtaining a crank arm 44 which is flexible in the radial direction for accommodating any radial movement of the ends thereof and rigid in the transverse direction for transferring actuating forces for translating valve 20. Furthermore, material such as steel or titanium can be used for fabricating the crank arms. Titanium is preferred in the present invention because it is a suitable elastically flexible material and also provides sufficient material strength for transferring actuating forces for translating valve 20.

As is readily appreciated from the foregoing description, the actuation system of the subject invention is a unique, simple, and lightweight apparatus. The advantages of this invention are useful in other applications on an aircraft engine, particularly in conjunction with a rear variable area bypass injector 24 (rear VABI) on the variable cycle engine 10 in FIG. 1.

Figure 5:
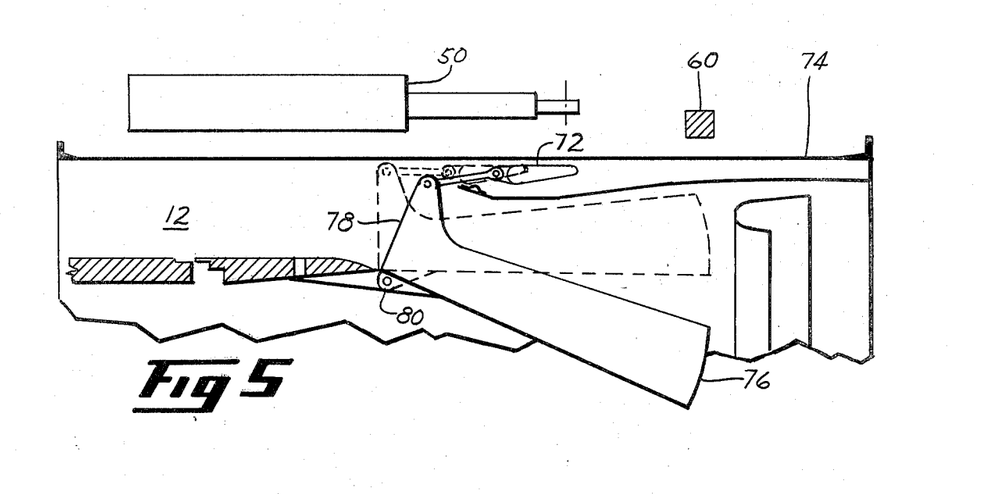
FIG. 5 depicts a plan view, partly in section and partly broken away, of one embodiment of the subject invention in conjunction with a rear variable area bypass injector.
Figure 6:
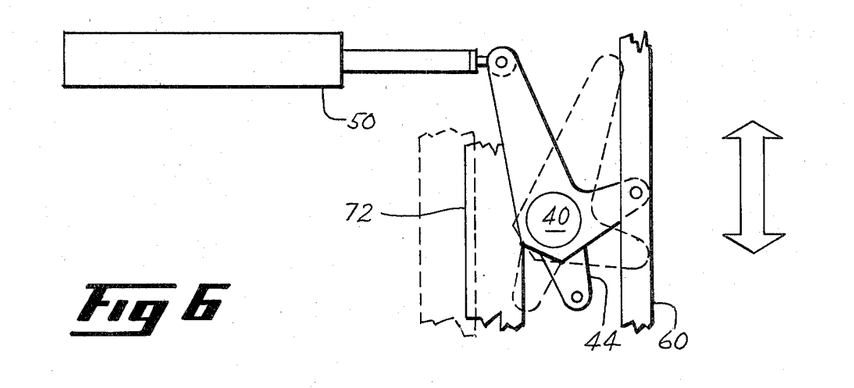
FIG. 6 depicts an elevation view of the embodiment of the subject invention shown in FIG. 5.

The general location of the actuating system 32 for the rear VABI is shown in FIG. 1 and components of this embodiment of the actuation system are shown in FIGS. 5 and 6. That part of actuation system 32 outside casing 74 can be identical to that part of actuation system 30 outside casing 22. This includes the hydraulic actuator 50, crankshafts 40, an outer synchronizing ring or yoke 60 and an actuation ring 72, the motion of which generally corresponds to that of the sliding valve in the forward VABI discussed earlier. In the embodiment of the actuation system 32 for the rear VABI, the actuation ring 72 is translated forward and aft by a pivoting of arms 44, shown in FIG. 6, one each extending from each of three partially rotating crankshafts 40. The crankshafts 40 are mounted on an augmentor casing 74 and transmit an actuating force of actuators 50 through the casing wall to the actuation ring 72. The initial actuating force is accomplished by three or more actuators 50, although a single actuator providing the requisite amount of force can alternatively be used, and the motion of these actuators is synchronized by means of a circumferentially moving synchronizing ring or yoke 60 that interconnects all the crankshafts 40, as shown.

Connecting elements of the actuation system 32 to a plurality of pivoting chutes 76 are shown in FIG. 5. Inside the augmentor casing 74, the actuation ring 72 is linked to an upper extension 78 of each of approximately twenty chutes 76 that are symmetrically distributed around the aft end of the bypass duct 12. The chutes 76 are pivotally mounted about pivots 80 so that translation of the actuation ring 72 along with the upper extension 78 causes the chutes 76 to pivot radially in and out of the core engine flowpath. The location of the chutes 76 and the effect of their movement inside the engine can be seen in FIG. 1. During engine operation, the action of the rear VABI is coordinated with the action of the forward VABI to properly direct bypass flow of fan air through the bypass duct and reintroduce the bypass flow to core engine flow prior to exhaust through the engine nozzle.

While the subject invention has been discussed in particular embodiments, it will be readily apparent to those skilled in the art that substantial modification of these embodiments can be made without departing from the concepts of the subject invention. For example, while the invention had been described in conjunction with a sliding member on the forward and rear VABI, the actuating system can conceivably activate any sliding, pivoting, or rotating member, or can potentially activate any of a variety of mechanisms with proper interface apparatus. In addition, the number and location of most of the various components of the subject invention can widely vary. As long as the conceptual characteristics of the invention are present, a departure from the invention has not taken place.

What is claimed as new and desired to be secured by Letters Patent of the United States is:

1. An actuation system for axially actuating an annular translating member internally mounted within a cylindrical outer casing of a gas turbine engine through which airflow passes, wherein said actuation system comprises:

a plurality of circumferentially spaced crankshafts extending through said casing for transmitting rotational movement;

actuating means for partially rotating at least one of said crankshafts;

means for inducing synchronous partial rotation of the plurality of crankshafts upon partial rotation of said one of said crankshafts, said means comprising:

(a) an arcuate synchronizing yoke extending around at least a portion of the outer circumference of said casing and having a rectangular, hollow, cross section;

(b) a plurality of first crank arms each having an end thereof fixedly attached to respective ones of said crankshafts for rotation therewith;

(c) a plurality of link arms each having one end pivotally attached to an opposite end of a respective one of said first crank arms, and an opposite end pivotally attached to said arcuate synchronizing yoke, said link arms being aligned substantially tangentially with said yoke;

(d) yoke mounting means comprising a plurality of pairs of concentric arcuate guide tracks fixedly mounted on opposite axial sides of said yoke; and a plurality of cooperating rollers each positioned between a pair of said guide tracks and each rotatably connected to a bracket fixedly mounted on said casing; and means connecting each of said crankshafts to said translating member for causing translation of said member upon rotation of said crankshafts.

2. An actuation system for axially actuating an annular translating member internally mounted within a cylindrical outer casing of a gas turbine engine through which airflow passes, wherein said actuation system comprises:

a plurality of circumferentially spaced crankshafts extending through said casing for transmitting rotational movement;

actuating means for partially rotating at least one of said crankshafts;

means for inducing synchronous partial rotation of the plurality of crankshafts upon partial rotation of said one of said crankshafts, said means comprising an arcuate synchronizing member circumferentially mounted for partial rotation around at least a portion of said casing, and connecting means corresponding to each of said crankshafts for connecting respective ones of said crankshafts to said synchronizing member whereby partial rotation of said synchronizing member is effective for inducing synchronous partial rotation of said crankshafts; and a plurality of radially flexible second crank arms within said casing, each having an end thereof fixedly attached to a respective one of said crankshafts for rotation therewith, and each having an opposite end thereof pivotally connected to said translating member, said second crank arms each being elastically deflectable radially to accommodate any changes in radial position of said opposite end thereof as each of said crank arms rotates to induce axial movement of said translating member upon rotation of said crankshafts.

3. The actuation system recited in claim 2, wherein said connecting means each further comprises:

a first crank arm having an end thereof fixedly attached to a respective one of said crankshafts for rotating therewith; and a link arm having one end pivotally attached to an opposite end of said first crank arm, and an opposite end pivotally attached to said arcuate synchronizing member.

4. The actuation system recited in claim 2, wherein said arcuate synchronizing member further comprises:

an arcuate synchronizing yoke extending around only a portion of the outer circumference of said casing and having rectangular, hollow, cross section; and yoke mounting means comprising a plurality of pairs of concentric arcuate guide tracks fixedly mounted on opposite axial sides of said yoke, and a plurality of cooperating rollers each positioned between a pair of said guide tracks and each rotatably connected to a bracket fixedly mounted on said casing, whereby movement of said yoke is constrained to circumferential rotation only.

5. The actuation system recited in claim 2, wherein said arcuate synchronizing member is a yoke extending around only a portion of the outer circumference of said casing.

6. The actuation system recited in claim 2, wherein each of said radially flexible second crank arms is thin in a radial transverse dimension relative to the radial dimension of an annular flowpath in said casing and is wide in an axial transverse dimension for thereby both reducing aerodynamic drag losses thereacross and being effective for transferring forces for axially actuating said translating member.

7. The actuation system recited in claim 2, wherein said outer casing cooperates with a concentric inner means to define an annular bypass duct of a turbofan engine, and wherein said annular translating member is an annular sliding valve for regulating airflow through a passage from a fan section of said engine to said bypass duct.

8. The actuation system recited in claim 2, wherein said actuating means comprises a linear actuator pivotally connected to an end of a third crank arm, which third crank arm has an opposite end fixedly connected to said one crankshaft.

9. An actuation system for axially actuating an annular sliding valve, wherein said valve regulates airflow through an annular passage connecting a fan section of a gas turbofan engine to a bypass duct and wherein said actuation system comprises:

a plurality of circumferentially spaced crankshafts for transmitting rotational motion and extending through an outer cylindrical casing surrounding said bypass duct;

actuating means for partially rotating at least one of said crankshafts, comprising a linear actuator pivotally connected to an end of a third crank arm, which third crank arm has an opposite end fixedly connected to one of said crankshafts;

means for inducing synchronous partial rotation of the plurality of crankshafts upon partial rotation of said one of said crankshafts, said means comprising:

(a) an arcuate synchronizing yoke extending around only a portion of the outer circumference of said casing and having a rectangular, hollow cross section;

(b) yoke mounting means comprising a plurality of pairs of concentric arcuate guide tracks fixedly mounted on opposite axial sides of said yoke, and a plurality of cooperating rollers each positioned between a pair of said guide tracks and each rotatably connected to a bracket fixedly mounted on said casing;

connecting means corresponding to each of said crankshafts for connecting respective ones of said crankshafts to said yoke each comprising a first crank arm having an end thereof fixedly attached to a respective one of said crankshafts for rotating therewith, and a link arm having one end pivotally attached to an opposite end of said first crank arm, and an opposite end pivotally attached to said yoke whereby partial rotation of said one crankshaft will induce said yoke and connecting means to synchronously rotate all remaining crankshafts an equivalent amount; and valve connecting means within said casing comprising a plurality of radially flexible second crank arms each having an end thereof fixedly attached to a respective one of said crankshafts for rotation therewith, and each having an opposite end thereof pivotally connected to said translating member, said second crank arms each being elastically deflectable radially to accommodate any changes in radial position of said opposite ends thereof as each of said crank arms rotates to induce axial movement of said translating member upon rotation of said crankshafts.

10. The actuation system as recited in claim 4 or 9, wherein said yoke mounting means further comprises rub pads of friction-reducing material fixedly positioned between said tracks for providing a low friction contact area for said rollers.

11. An actuation system for pivoting chutes of a rear variable area bypass injector internally mounted within a cylindrical outer casing of a gas turbine engine at a downstream end of a bypass duct, wherein said actuation system comprises:

a plurality of crankshafts extending through said casing for transmitting rotational movement;

actuating means for rotating one or more of said crankshafts;

means for inducing synchronous partial rotation of the plurality of crankshafts upon partial rotation of one of said crankshafts, said means comprising an annular synchronizing ring or yoke circumferentially mounted for partial rotation around at least a portion of said casing, and means corresponding to each of said crankshafts for connecting said crankshafts to said ring wherein partial rotation of said ring will induce synchronous partial rotation of said crankshafts;

means connecting each of said crankshafts to a translating member within said outer casing for causing translation of said member upon rotation of said crankshafts;

means connecting said translating member to an upper extension of each of said chutes for translation thereof; and a pivot upon which each of said chutes is mounted whereby translation of said upper extension causes pivoting of each of said chutes.

* * * * *